(12) United States Patent
Cardona Rivera et al.

(10) Patent No.: US 12,453,442 B2
(45) Date of Patent: Oct. 28, 2025

(54) TEMPERATURE-CONTROLLED MEAL TRANSPORT

(71) Applicant: GorillaWurx LLC, Chicago, IL (US)

(72) Inventors: Jose E. Cardona Rivera, Pasadena, CA (US); William C Patton, Jr., Campbellsville, KY (US); Luke Gray, London (GB); Joseph Ricker, Buffalo Grove, IL (US)

( * ) Notice: Subject to any disclaimer, the term of this patent is extended or adjusted under 35 U.S.C. 154(b) by 581 days.

(21) Appl. No.: 17/844,162

(22) Filed: Jun. 20, 2022

(65) Prior Publication Data

US 2023/0404326 A1 Dec. 21, 2023

(51) Int. Cl.
  *A47J 39/02* (2006.01)
  *A47J 36/24* (2006.01)
  *F24C 7/10* (2021.01)
  *F25D 11/00* (2006.01)

(52) U.S. Cl.
  CPC ............ *A47J 39/02* (2013.01); *A47J 36/2483* (2013.01); *F24C 7/10* (2013.01); *F25D 11/006* (2013.01); *A47J 2202/00* (2013.01)

(58) Field of Classification Search
  CPC ........ A47J 39/006; A47J 47/14; A47J 27/122; A47J 39/02; A47J 36/2483; A47J 2202/00; F25D 3/08; F25D 11/00; F25D 19/04; F25D 23/12; F25D 2400/20; F25D 11/006; F25D 29/003; F25D 2201/14; F25D 2400/02; F25D 2400/361; F25D 2700/12; F24C 7/10
  See application file for complete search history.

(56) References Cited

U.S. PATENT DOCUMENTS

| | | | |
|---|---|---|---|
| 3,992,069 A * | 11/1976 | Kitterman | A47J 47/14 D7/610 |
| 4,171,151 A * | 10/1979 | Luck | A47J 47/14 312/236 |
| 5,403,997 A | 4/1995 | Wimpee et al. | |
| 5,797,445 A | 8/1998 | Westbrooks, Jr. et al. | |

(Continued)

FOREIGN PATENT DOCUMENTS

| | | |
|---|---|---|
| EP | 0 529 989 | 3/1993 |
| EP | 1 817 993 | 1/2007 |

(Continued)

*Primary Examiner* — Shawn M Braden
(74) *Attorney, Agent, or Firm* — Paul E Schaafsma; NvusIP, LLC

(57) ABSTRACT

A method of and container for temperature-controlled meal transport are provided. A food tray accommodation area is defined in the interior of the meal transport container. A plurality of ledges are defined in the food tray accommodation area, the ledges designed to support a plurality of different sized food trays. An insulator is provided to insulate the food tray accommodation area. A pair of integral upper carrying handles and a pair of integral lower handles are provided. The upper integral carrying handles are designed to nest with the integral lower handles when a plurality of meal transport containers are stacked. A thermometer monitors temperature within the food tray accommodation area. Heating elements heat cooked food from a cooled temperature to an appropriate hot-serving temperature, maintain heated food at temperature, and cook raw food.

17 Claims, 16 Drawing Sheets

(56) References Cited

U.S. PATENT DOCUMENTS

| | | | |
|---|---|---|---|
| 5,896,915 A | 4/1999 | Westbrooks, Jr. et al. | |
| 6,034,355 A | 3/2000 | Naderi et al. | |
| 6,073,547 A | 6/2000 | Westbrooks, Jr. et al. | |
| 6,120,819 A | 9/2000 | Violi et al. | |
| 6,279,470 B2 | 8/2001 | Simeray et al. | |
| 6,427,761 B1 | 8/2002 | Georges | |
| 6,483,089 B1 | 11/2002 | Wright et al. | |
| 6,501,057 B1 | 12/2002 | Jarvis | |
| 6,539,846 B2 | 4/2003 | Citterio et al. | |
| 6,684,657 B1 | 2/2004 | Dougherty | |
| 6,745,675 B2 | 6/2004 | Richard et al. | |
| 6,802,367 B1 | 10/2004 | Westbrooks, Jr. et al. | |
| 7,025,121 B2 | 4/2006 | Whitehead et al. | |
| 7,034,254 B2 | 4/2006 | Grabowski et al. | |
| 7,134,552 B1 * | 11/2006 | McDonagh | A47J 47/14 62/3.62 |
| 7,183,518 B2 | 2/2007 | Near et al. | |
| RE39,551 E | 4/2007 | Speranza | |
| 7,216,504 B2 | 5/2007 | Armer et al. | |
| 7,565,066 B2 | 7/2009 | Hipp et al. | |
| D637,373 S * | 5/2011 | Benning | D7/347 |
| 8,168,923 B2 | 5/2012 | Wong et al. | |
| 8,186,178 B2 | 5/2012 | Boss | |
| 8,263,906 B2 | 9/2012 | Jarvis et al. | |
| D697,685 S * | 1/2014 | Maddux | D34/19 |
| 8,931,293 B2 | 1/2015 | Shei et al. | |
| 9,161,620 B2 | 10/2015 | Nicholson | |
| D786,607 S * | 5/2017 | Maddux | D7/323 |
| 9,797,633 B2 | 10/2017 | Beach | |
| 9,924,833 B2 | 3/2018 | Rigaud et al. | |
| 9,992,822 B2 | 6/2018 | Sickels et al. | |
| 10,133,992 B2 | 11/2018 | Walter et al. | |
| 10,405,650 B2 | 9/2019 | Turner et al. | |
| 10,646,034 B2 * | 5/2020 | Olson | F25D 3/06 |
| D891,875 S * | 8/2020 | Olson | D34/19 |
| 10,881,199 B1 | 1/2021 | Le et al. | |
| 2008/0289514 A1 | 11/2008 | Speranza | |
| 2012/0085745 A1 | 4/2012 | Brattoli | |
| 2014/0325998 A1 | 11/2014 | Jarvis et al. | |

FOREIGN PATENT DOCUMENTS

| | | |
|---|---|---|
| WO | WO 96/0890 | 3/1996 |
| WO | WO 13/110996 | 8/2013 |

* cited by examiner

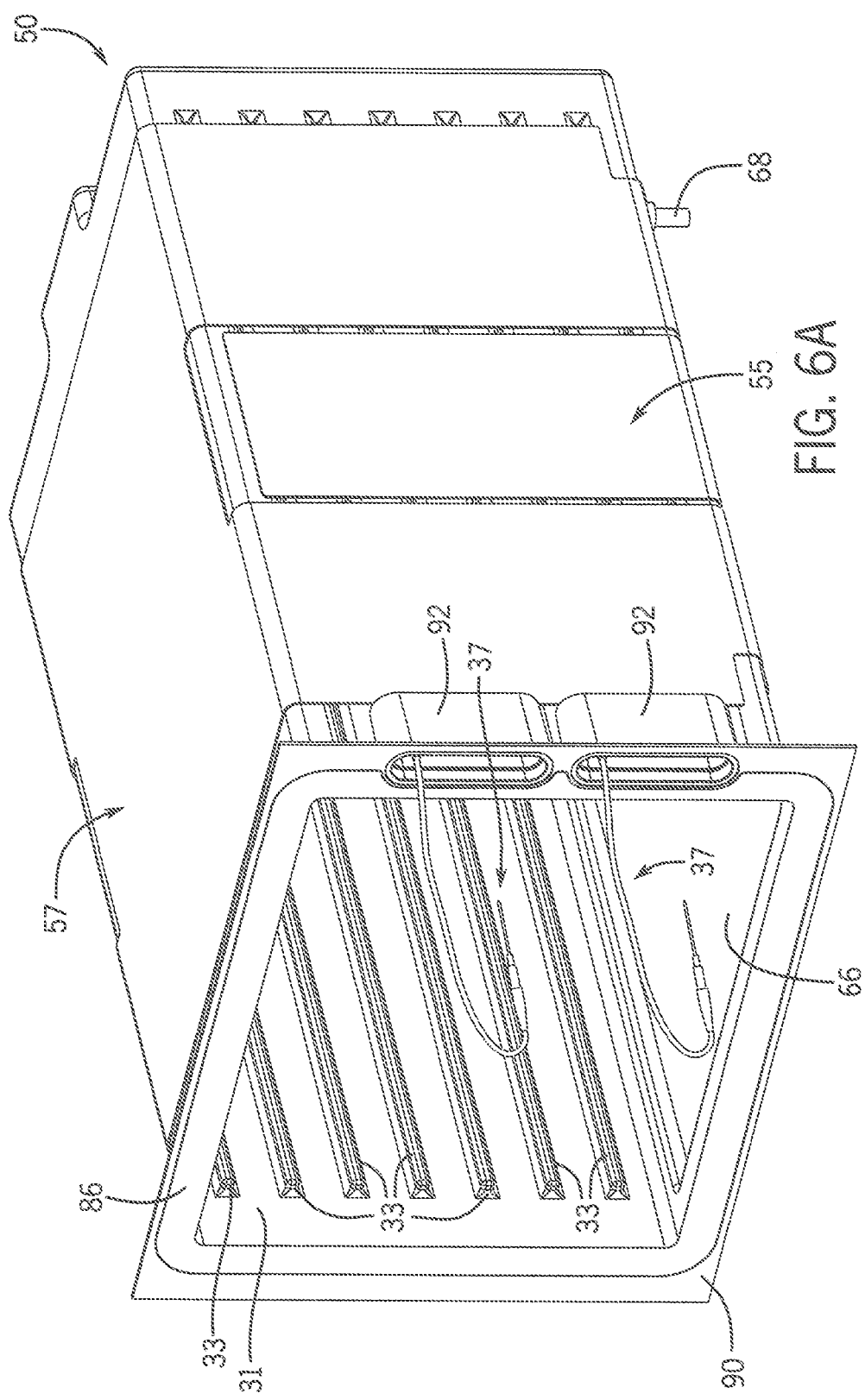

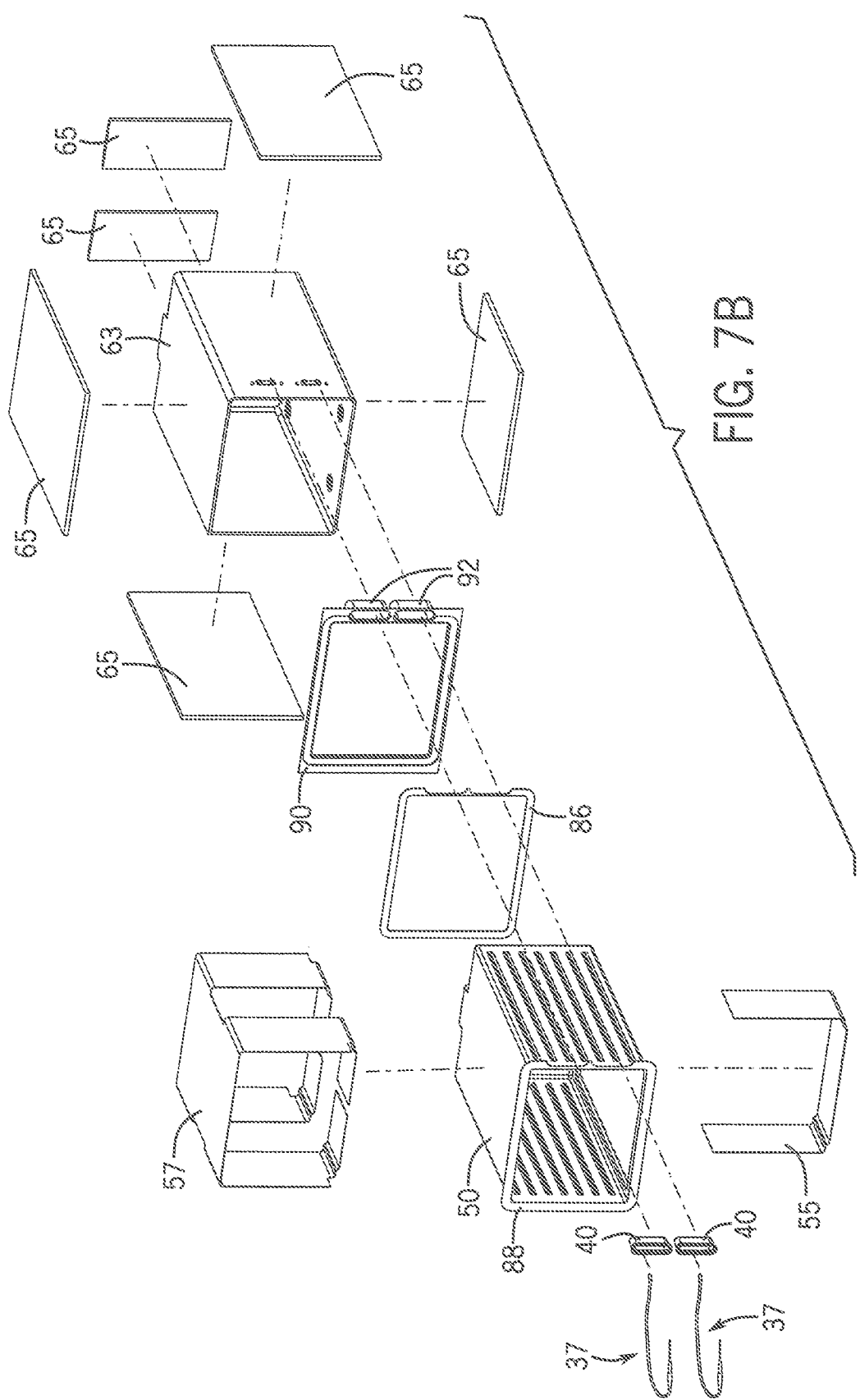

TEMPERATURE-CONTROLLED MEAL TRANSPORT

FIELD OF THE INVENTION

This invention relates to systems and apparatus for cooling, maintaining, transporting, and heating or cooking meals for transport and serving.

BACKGROUND OF THE INVENTION AND STATE OF THE ART

The dispensing of meal in institutions frequently involves the initial preparation of meals at a food-preparation location followed by the meal being transported and dispensed at a meal-consumption location. At the food-preparation location, the food is prepared and then divided into individual portions, either bulk in hotel pans for consumption by multiple people on a lunch line or family style or in individual packages for consumption by one person on a food tray, at the meal-consumption location. Given the food tray is loaded with ready to eat food at the food-preparation location, the need arises to ensure that the meal is kept at a storage temperature where deterioration, for quality and food safety considerations, will be minimized or eliminated until a regeneration or cooking step is undertaken to ensure that the consumer receives the meal in an appropriate serving condition at the correct temperature.

To meet these requirements, it is commonly the practice to make use of relatively large, cabinet-sized mobile trolleys having wheels into which a relatively large number of trays of prepared meals from the food-preparation location are placed and transported at the storage temperature to the meal-consumption location. At the meal-consumption location, a regenerative cycle is undertaken. Such trolleys are typically found in environments such as hospitals, nursing homes or airlines where a single entity owns the facility so the entire distribution environment is under the design and control of that single entity. Thus, the mobile trolley cabinets are designed to contain as many trays as practicable while the physical requirements of the distribution environments such as door sizes, height variances, ramp inclines, storage area sizes, etc. are designed to specially accommodate the size of the mobile trolley cabinets.

However, these mobile trolley cabinets are of little use when delivering meals to meal-consumption institutions such as schools, where the distribution environment can be under the design and control of multiple entities. In these environments impediments such as varying door sizes, multiple stories not accessible by elevators, stairways, etc. make the use of such large mobile trolley cabinets of little use. In addition, these prior art systems are poorly equipped for deliveries to smaller entities such as for example day care centers that have only a few pans of food for example 40 children instead of large retherm oven that works for 300 people. The carts that transport food thus require use of cold holding and a rethermlizing oven. This takes up space and increases capital cost requirements, with existing large and cumbersome cold holding and hot rethermlizing ovens for institutions costing over $80,000 and requiring specific space allocations and specific power requirements. These also require more labor due to the transfer of food from cold holding to retherm to hot holding. In addition, the status of the food container is not tracked as to where it is or what state it is in, whether it has been delivered or not and whether it is ready to be returned to the central kitchen. Access to information on the ovens or containers currently does not exist to tell the user what to do next.

What would thus be beneficial would be a method and mechanism to deliver local and sustainable meals and healthier eating options to consumers in institutions such as for example school kids and food service operators in institutional settings. What would also be beneficial would be a method and mechanism that streamlines the delivery of such meals in addition to heating up those meals and facilitating the return of the containers the meals were in. What would be further beneficial would be a method and mechanism capable of cooling, maintaining, transporting, and heating or cooking such meals to institutions contained in varying environments, and incorporating sensing, web connected, remote monitoring and control, and battery-powered temperature control and using existing available electricity 120-volt/20-amp circuit available for example in a regular wall outlet.

SUMMARY OF THE INVENTION

This Summary of the Invention is provided to introduce a selection of concepts in a simplified form that are further described below in the Detailed Description section. This Summary of the Invention is not intended to identify key features or essential features of the claimed subject matter, nor is it intended to be used as an aid in determining the scope or spirit of the claimed subject matter.

A method and mechanism in accordance with the principals of the present invention delivers local and sustainable meals and healthier eating options to institutional consumers such as for example school kids and food service operators in institutional settings. A method and mechanism in accordance with the principals of the present invention streamlines the delivery of such meals in addition to heating up those meals and facilitating the return of the containers the meals were in. A method and mechanism in accordance with the principals of the present invention is capable of cooling, maintaining, transporting, and heating or cooking such meals to institutions contained in varying environments, and incorporating sensing, web connected, remote monitoring and control, and battery-powered temperature control and using existing available electricity 120-volt/20-amp circuit available for example in a regular wall outlet.

In accordance with the principals of the present invention, a method of and container for temperature-controlled meal transport are provided. A front panel provides access to an interior of the meal transport container. A food tray accommodation area is defined in the interior of the meal transport container. A plurality of ledges are defined in the food tray accommodation area, the ledges designed to act together in pairs to receive and support an outer flange of a food tray, the plurality of ledges positioned to accommodate a plurality of different sized food trays. An insulator is provided to insulate the interior of the meal transport container. A pair of integral upper carrying handles are provided at the upper front periphery and rear periphery, the integral upper carrying handles having a width recessed from the outer periphery of the meal transportation container and extending above the upper panel. The meal transportation container is sized such that by utilizing the integral upper carrying handles a single user can carry the meal transportation container. A pair of integral lower handles are provided at the lower front and rear peripheries having a width greater than outer periphery of the meal transportation container and extending in front of the front panel. Thus, the upper integral carrying handles are designed to nest with the integral lower handles when a plurality of meal transport containers are stacked. The pair of integral lower handles have sufficient width greater than the outer periphery of the meal transportation container such that they are still accessible when nested above or below another meal transportation unit. A thermometer monitors temperature within the food tray accommodation area. A control panel contained on an exterior of the meal transport adapted to be accessible when a plurality of meal transport containers are stacked. In embodiments, a heating element heats cooked food from a cooled temperature to an appropriate hot-serving temperature from wall outlet alternating current power, a heating element maintains heated food at temperature from direct current power from a rechargeable battery, and raw food can be cooked utilizing a single heating element at a lower range of cooking temperatures while at a higher range of cooking temperatures by utilizing the pair of heating elements.

This Summary of the Invention introduces concepts in a simplified form that are further described below in the Detailed Description. This Summary of the Invention is not intended to identify key features or essential features of the claimed subject matter, nor is it intended to be used as an aid in determining the scope of the claimed subject matter.

BRIEF DESCRIPTION OF THE DRAWINGS

The accompanying Drawings illustrate several embodiments and, together with the description, serve to explain the principles of the present invention according to the example embodiments. It will be appreciated by one skilled in the art that the particular arrangements illustrated in and described with respect to the Drawings are merely exemplary and are not to be considered as limiting of the scope or spirit of the present invention in any way.

FIG. 6A is top front angled view of food tray accommodation area housing of the meal transportation container of FIG. 1.

FIG. 7B is a partially exploded view of the shelf sub-assembly of the meal transportation container of FIG. 1.

Figure 1A:
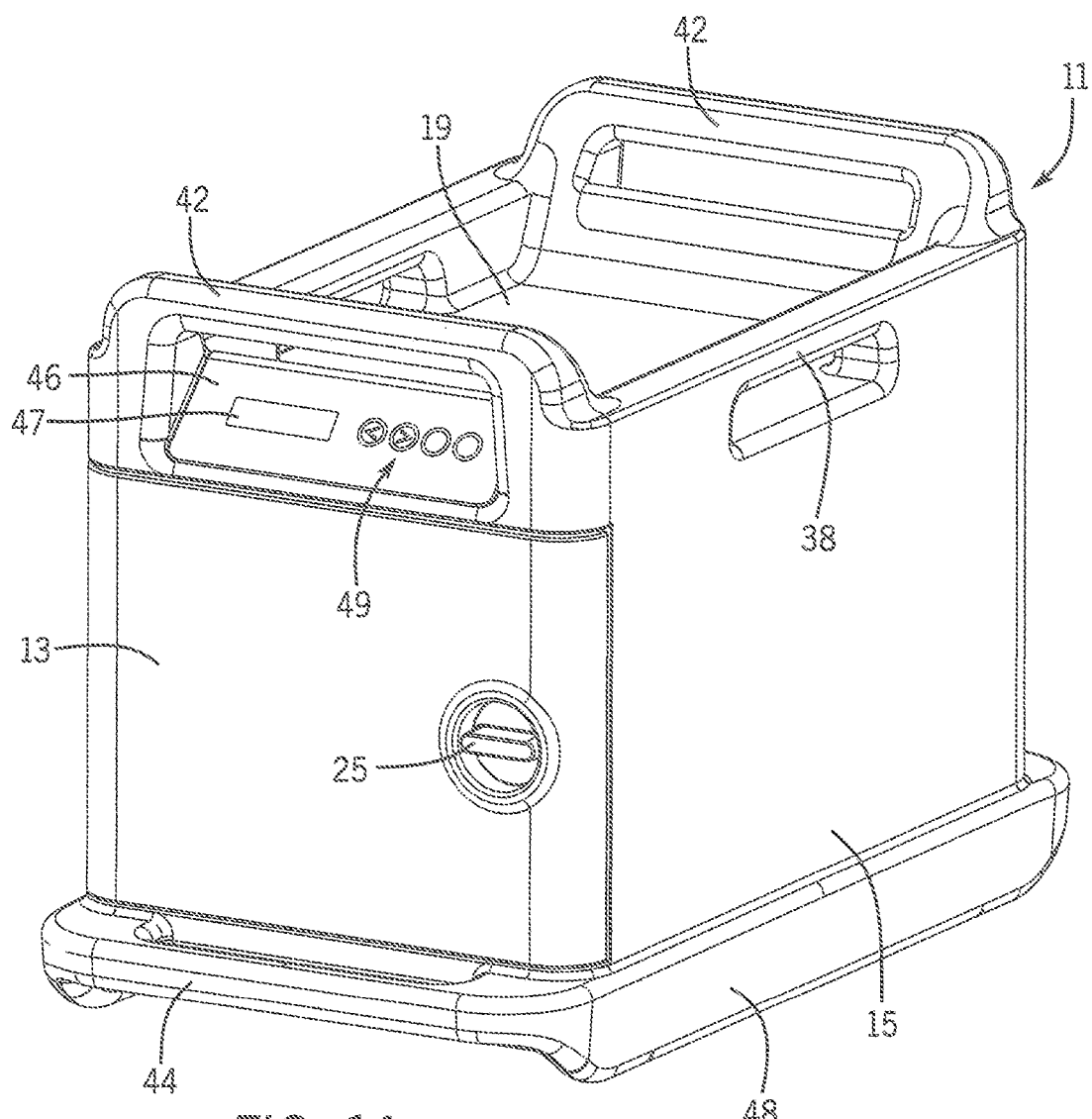
FIG. 1A is an upper, perspective view of a meal transportation container according to an example embodiment in accordance with the principals of the present invention.

As noted above, in the above reference Drawings, the present invention is illustrated by way of example, not limitation, and modifications may be made to the elements illustrated therein, as would be apparent to a person of ordinary skill in the art, without departing from the scope or spirit of the invention.

DETAILED DESCRIPTION OF PREFERRED EMBODIMENTS

Introduction

A temperature-controlled meal transport in accordance with the principals of the present invention provides local and sustainable meals and healthier eating options to institutional consumers such as for example school kids and food service operators in institutional settings. A temperature-controlled meal transport in accordance with the principals of the present invention streamlines the delivery of such meals in addition to heat up of those meals and facilitating the return of the containers the meals were in. A meal transportation container in accordance with the principals of the present invention is capable of cooling, maintaining, transporting, and heating or cooking such meals to institutions contained in varying environments, incorporating sensing, web connected, remote monitoring and control, and passive along with active battery-powered and power outlet temperature control and using existing available electricity 120-volt/20-amp circuit available for example in a regular wall outlet.

An implementation of a meal transportation container in accordance with the principals of the present invention is designed to be capable of: maintaining cold-loaded food at a temperature (for example, below 38° F. (3.3° C.)) by providing enhanced insulation capacity; heating a given amount of cooked food (for example, approximately 25 lbs. (11.5 kg)) from the maintained cold-loaded temperature to an appropriate hot-serving temperature (for example, to 165° F. (79.9° C.) in less than two hours) utilizing alternating current from a wall outlet; maintaining a hot-serving temperature (for example, above 150° F. (65.5° C.)) for a sufficient time period (for example, at least four hours and preferably six hours) utilizing direct current power from a battery; cooking a given amount of raw food (for example, approximately 25 lbs. (11.5 kg) at up to 400° F. (200° C.)) utilizing a single heating element at a lower range of cooking temperatures while at a higher range of cooking temperatures by utilizing both direct current power from a battery and alternating current from a wall outlet; and communicating information about meal transportation container such as the food temperature to the user via a control screen as well as through an online portal. Various states of the meal transportation container can be controlled remotely, such as for example retherm, hot hold, cook etc. so onsite user does not have to control.

In accordance with the principals of the present invention, prepared meals and raw food can be cooled by placement of the food in a food tray, placement of the food tray in a food tray accommodation area of the meal transportation container, and placement of the meal transportation container in a cold storage environment; thus, the cold storage environment is utilized to cool the food. Cooled food temperature can be maintained in transit by the enhanced insulative properties of the meal transportation container and/or by use of a frozen eutectic plate designed to fit inside the food tray accommodation area. Cooled food can be reheated or "rethermed" by a heating element utilizing alternating current power from a wall outlet. Heated food can be maintained by a heating element utilizing direct current power and a direct-current activated heating element from a rechargeable battery. Raw food can be cooked utilizing a single heating element at a lower range of cooking temperatures while at a higher range of cooking temperatures by utilizing the pair of heating elements utilizing both direct current power from a battery and alternating current from a wall outlet.

Because some meal-consumption environments such as schools may be less than easily accessed, the size and weight and number of food trays are such that the meal transportation container is designed so a single user can carry the meal transportation container. The meal transportation container food tray accommodation area is flexible to accommodate a plurality of different sized food trays with standard pans either imperial based standard hotel pans for United States or gastronomic metric sized pans from the rest of the world. To aid in storage convenience, vehicle delivery capacity, reduced footprint, etc., the meal transportation containers are stackable, with integral handles that are easily accessible when stacked. A cellular/wifi web/internet connected control panel is located on an angled recessed portion of the meal transportation container so that the control panel is accessible when stacked. The control panel can include an input interface and a display.

In accordance with the principals of the present invention, to accomplish energy delivery capacity to "retherm" cooled food, cook raw food, and maintain heated food in accordance with the principals of the present invention resistive heating elements can be utilized. In an aspect in accordance with the principals of the present invention, this three-level heating requirement can be economically achieved by providing a pair of resistive heating elements. A first resistive heating element can be provided having a relatively low capacity sufficient to maintain heated food utilizing direct current power from the rechargeable battery. A second resistive heating element can be provided having a relatively high capacity sufficient to "retherm" cooled food utilizing alternating current power from a wall outlet. And by utilizing the second resistive heating element sufficient temperature can be achieve to cook raw food at a lower range of cooking temperatures while by utilizing the first resistive heating element and the second resistive heating element together, a heating capacity sufficient to cook raw food at a higher range of cooking temperatures can be achieved.

Initial Considerations

Generally, one or more different embodiments may be described in the present application. Further, for one or more of the embodiments described herein, numerous alternative arrangements may be described; it should be appreciated that these are presented for illustrative purposes only and are not limiting of the embodiments contained herein in any way. One or more of the arrangements may be widely applicable to numerous embodiments, as may be readily apparent from the disclosure.

In general, arrangements are described in sufficient detail to enable those skilled in the art to practice one or more of the embodiments, and it should be appreciated that other arrangements may be utilized and that structural, logical, software, electrical and other changes may be made without departing from the scope or spirit of the present invention. Particular features of one or more of the embodiments described herein may be described with reference to one or more particular embodiments or figures that form a part of the present invention, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the present invention in any way.

Devices and parts that are connected to or in fluid communication with each other need not be in continuous connection or fluid communication with each other, unless expressly specified otherwise. In addition, devices and parts that are connected to or in fluid communication with each other may fluid communicate directly or indirectly through one or more connection or fluid communication means or intermediaries, logical or physical.

A description of an aspect with several components in connection or fluid communication with each other does not imply that all such components are required. To the contrary, a variety of optional components may be described to illustrate a wide variety of possible embodiments and in order to more fully illustrate one or more embodiments.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity; however, it should be appreciated that particular embodiments may include multiple iterations of a technique or multiple instantiations of a mechanism unless noted otherwise. Alternate implementations are included within the scope or spirit of various embodiments in which, for example, functions may be executed out of order from that shown or discussed, including substantially concurrently or in reverse order, depending on the functionality involved, as would be understood by those having ordinary skill in the art.

Conceptual Architecture

Figure 1B:
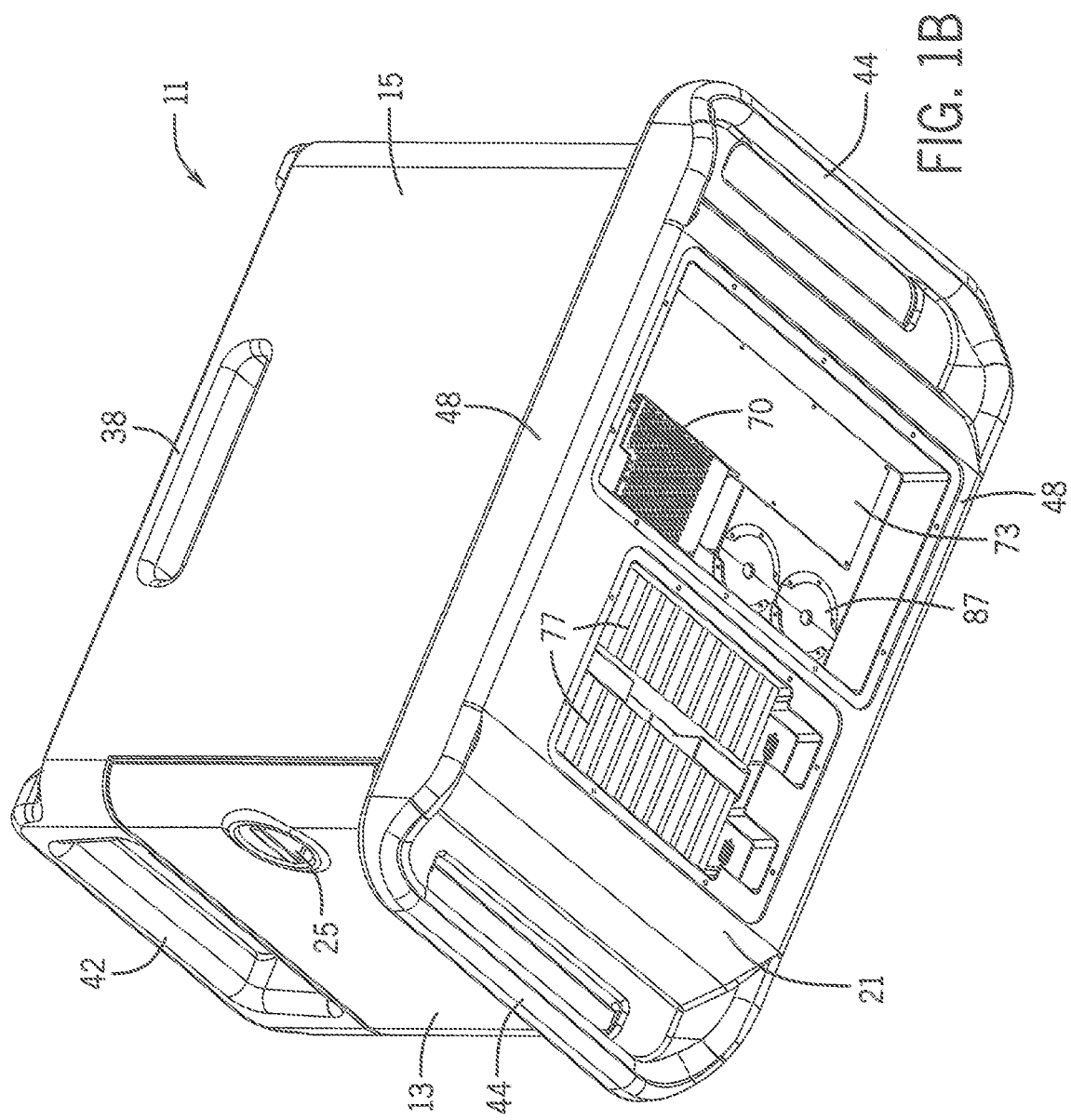
FIG. 1B is a lower, perspective view of the meal transportation container of FIG. 1A.

In more detail and referring to FIG. 1, an upper, perspective view of a meal transportation container according to an example embodiment in accordance with the principals of the present invention is seen in FIG. 1A while a lower perspective view of the meal transportation container of FIG. 1A is seen in FIG. 1B. The meal transportation container is designed to accommodate meal- or food-holding pans or trays, referred to herein as food trays. The meal transportation container includes an outer box 11 which comprises a front panel 13, a pair of side panels 15, a rear panel 17, an upper panel 19, and a lower panel 21; as detailed below, in an implementation the side panels 15, rear panel 17, upper panel 19, and lower panel 21 can be formed as an integral outer box 11.

The front panel 13 is utilized to gain access to the interior of the meal transportation container; thus, the front panel 13 can comprise a door which can be hingedly connected to a respective side panel 15. Of course, alterative access means can be provided such as for example a pair of doors, and the door(s) can be hingedly connected to the upper or lower (or both) panels. To ease in gaining access to the interior of the meal transportation container, the door 13 can define a door handle 25. By turning and pulling the door handle 25 the front panel 13 can be opened exposing access to the interior of the meal transportation container, as seen in FIG. 2.

As seen in FIG. 1B, cavities can be defined in the lower panel 21 to receive various electronic components of the meal transportation container such as a power supply 70, one or more rechargeable batteries 77, a main printed circuit board (PCB) 73, and a wire passthrough 87; access panels can be provided to cover and protect these electronic components. More detail on the electronic components of the meal transportation container is provided below.

Figure 2:
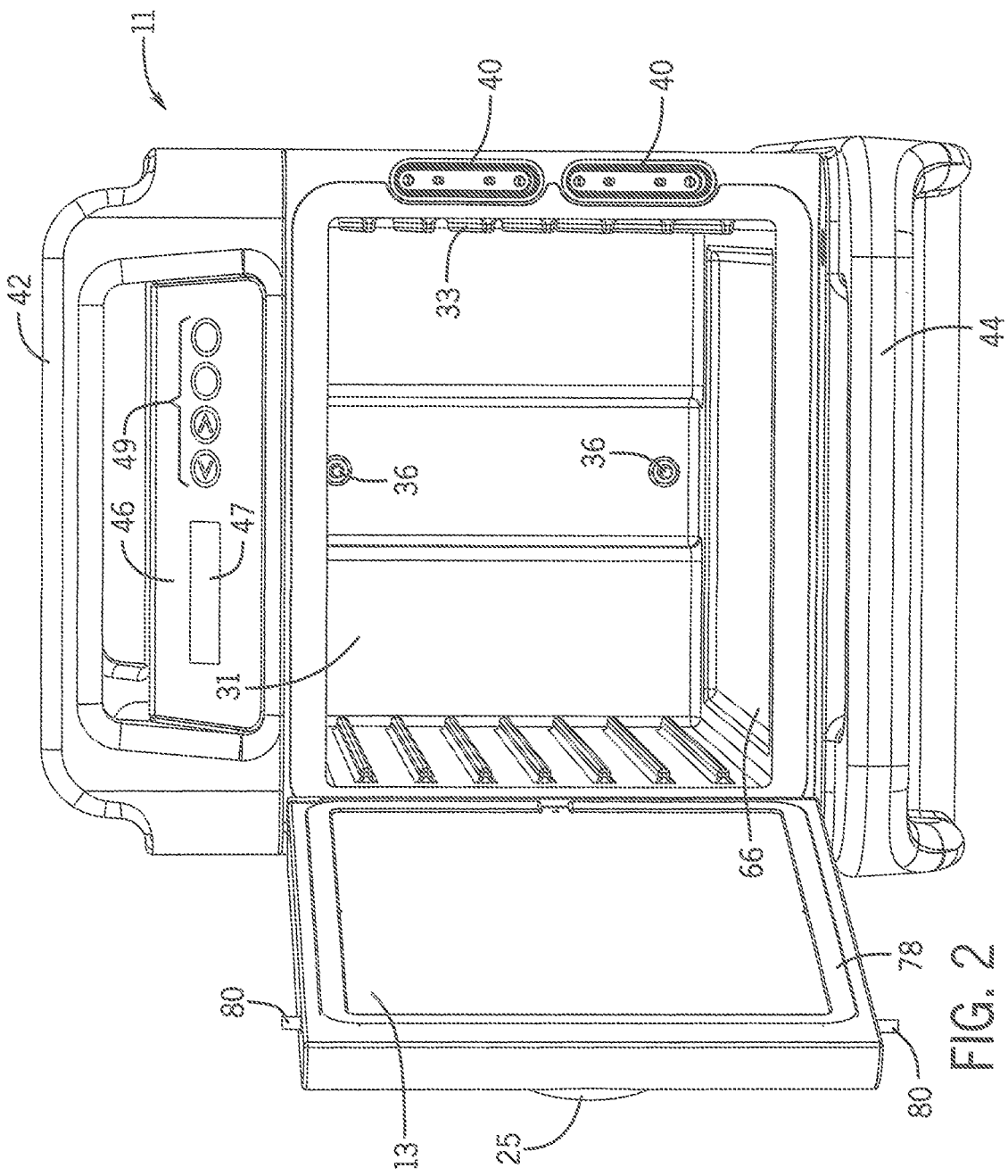
FIG. 2 is a perspective view of the meal transportation container of FIG. 1 with the front panel opened exposing access to the interior.
Figure 3A:
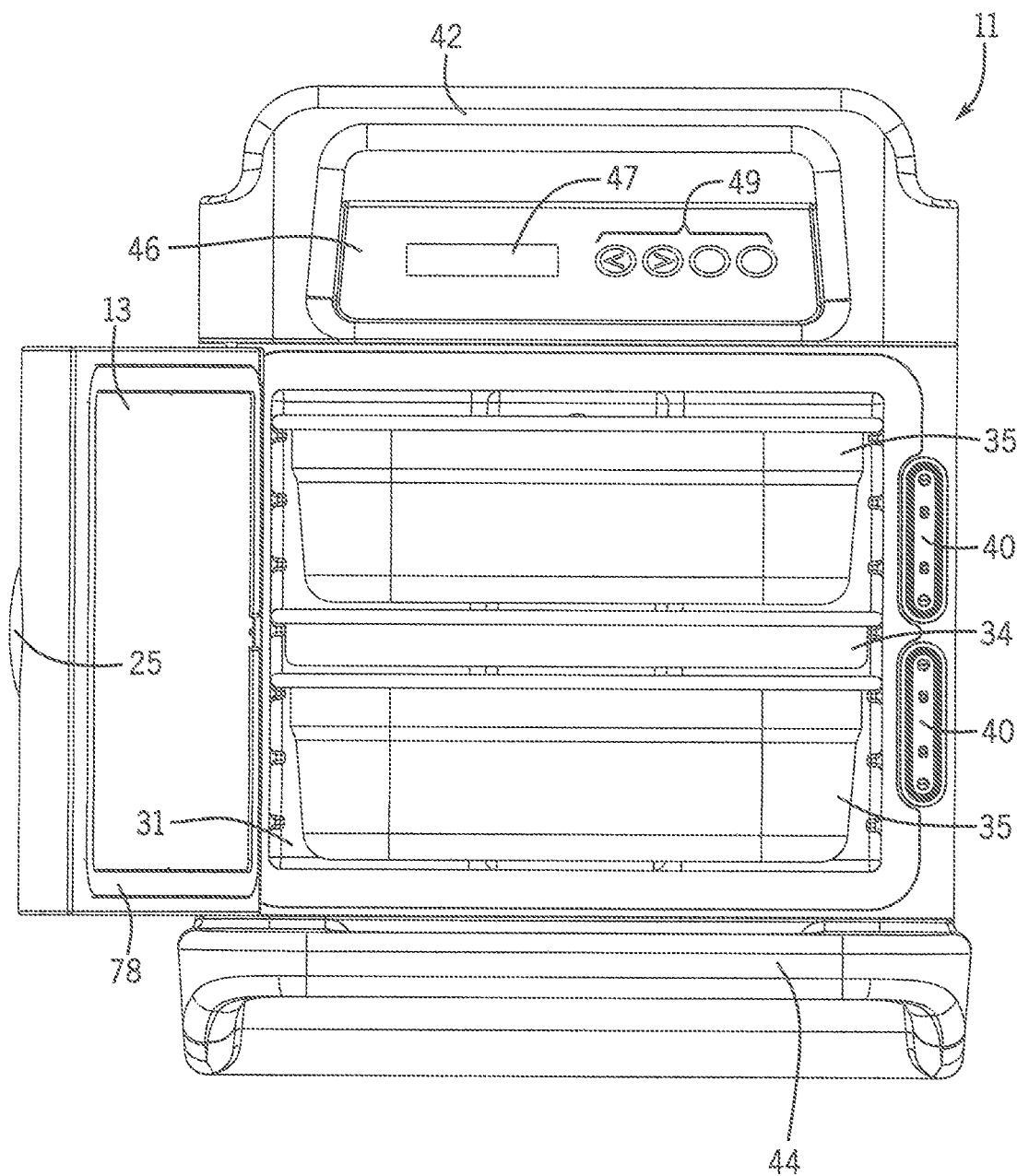
FIG. 3A is a perspective view of the meal transportation container of FIG. 1 with the front panel opened showing examples of different sized food trays in the food tray accommodation area.
Figure 3B:
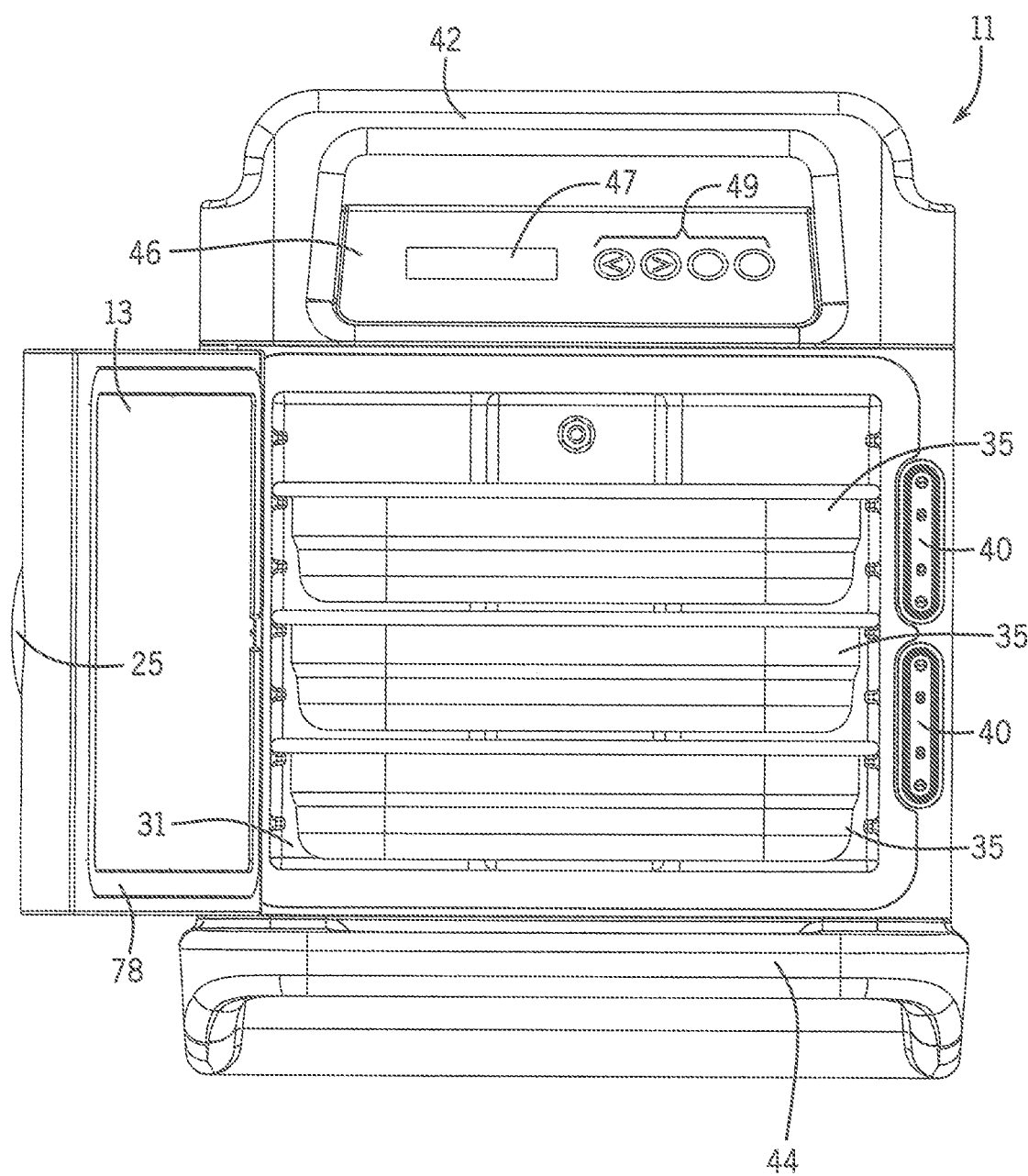
FIG. 3B is a perspective view of the meal transportation container of FIG. 1 with the front panel opened showing further examples of different sized food trays in the food tray accommodation area.
Figure 3C:
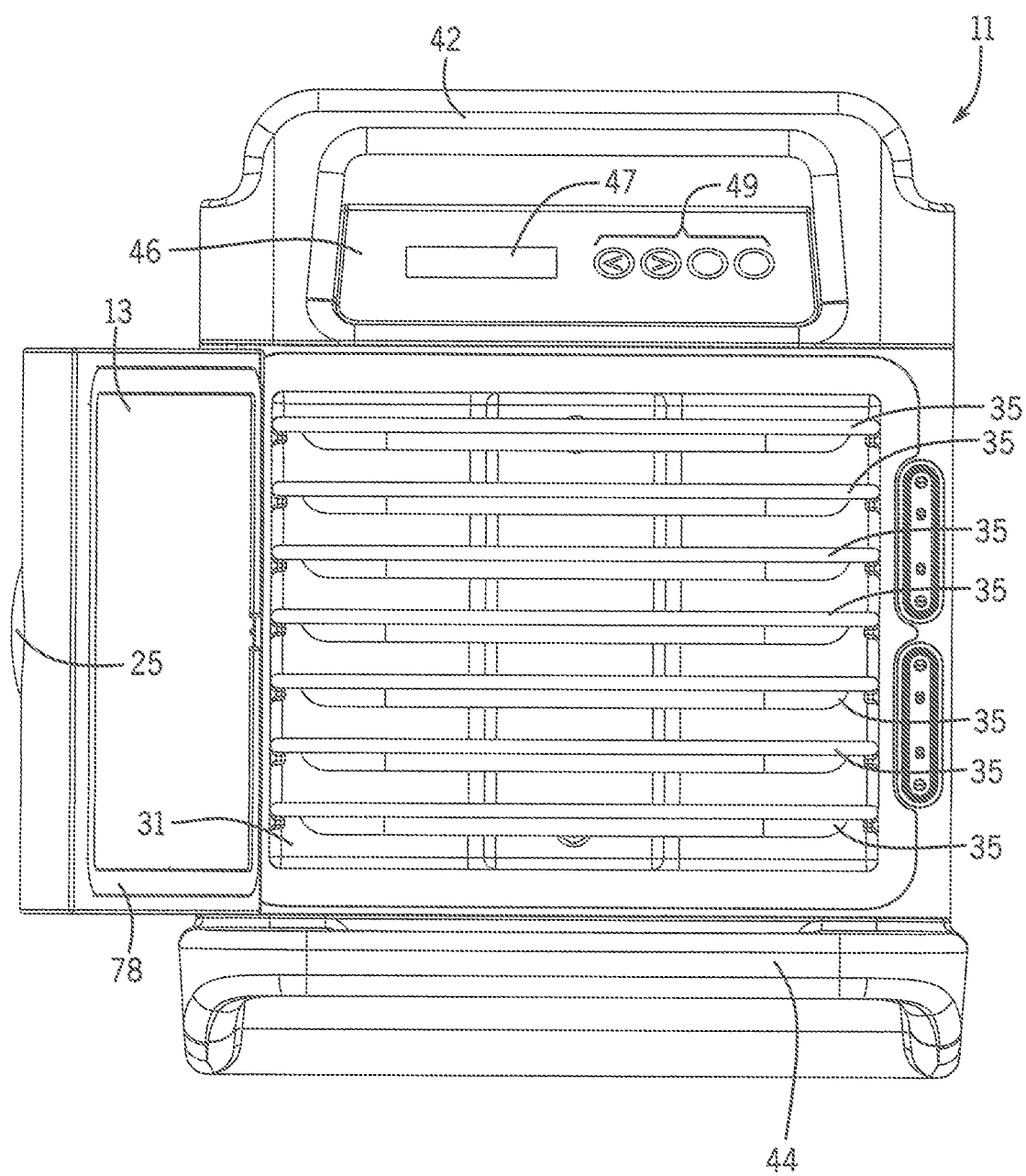
FIG. 3C is a perspective view of the meal transportation container of FIG. 1 with the front panel opened showing further examples of different sized food trays in the food tray accommodation area.

Referring to FIG. 2, a perspective view of the meal transportation container of FIG. 1 is seen with the front panel 13 opened, exposing a food tray accommodation area 31. While the implementation described herein comprises a single food tray accommodation area 31, depending on the use additional embodiments can comprise a plurality of food tray accommodation areas within a meal transportation container such that the different food tray accommodation areas can maintain different temperature profiles. The interior sidewalls of the food tray accommodation area 31 of the meal transportation container define a plurality of ledges 33 that act together in pairs to comprise a plurality of food tray shelves. The ledges 33 are designed to receive and support an outer flange of a food tray 35. By providing a plurality of ledges 33 on the interior sidewalls of each food tray accommodation area 31, a plurality of different sized food trays 35 can be accommodated. This can be seen in FIG. 3, where FIG. 3A shows two four-inch (100 mm) food trays 35 in the food tray accommodation area 31 separated by a frozen eutectic plate 34. The frozen eutectic plate 34 is designed to mimic the shape of a food tray, with outer flanges being supported by a pair of ledges 33. FIG. 3B shows three 2.5-inch (65 mm) food trays 35 in the food tray accommodation area 31 and FIG. 3C shows seven one-inch (20 mm) food trays 35 in the food tray accommodation area 31. Of course, depending on the use by utilizing various pairs of the plurality of ledges 33 supporting outer flanges, various combinations of different sized food trays can be placed in the food tray accommodation area 31 such as, for example, one four-inch (100 mm) food tray combined with two 2.5 inch (65 mm) food trays in the food tray accommodation area 31, two 2.5 inch (65 mm) food trays combined with four one-inch (20 mm) food trays 35, as well as countless other combinations.

Referring back to FIG. 1, a pair of upwardly extending integral carrying handles 42 are provided at the front and rear periphery of the top of the meal transportation container. The integral upper carrying handles have a width recessed from the outer periphery of the meal transportation container and extending above the upper panel 19. A pair of integral side handles 38 can be defined in side panels 15. A pair of outwardly extending integral lower handles 44 are provided at the front and rear peripheries of the bottom 21 of the meal transportation container. The integral lower handles 44 have a width greater than outer periphery of the meal transportation container and extending in front of the front panel 13. The pair of integral side handles 38 can be used to push and pull the meal transportation container to slide across preparation tables and can also be used by two individuals walking side by side, each carrying one of the integral side handles 38. The integral lower handles 44 can be used to lift the meal transportation container by an individual such that the center of gravity of the meal transportation container is better located inside the users power zone, where risk of injury due to physical exertion is minimized. By lifting the meal transportation container using the integral lower handles 44, the meal transportation container can be more easily placed on an elevated surfacer such as a table or a stack of other meal transportation containers. The design of the upwardly extending integral upper carrying handles 42 and the outwardly extending integral lower handles 44 provide for a notable aspect in the efficient transportation of the meal transportation containers, as detailed below.

A cellular/wifi web/internet connected control panel 46 is provided. The control panel 46 can include a control panel printed circuit board (PCB) including a display 47, and an input interface comprising user input buttons 49, either incorporated into the display 47 or provided separately. The control panel 46 provides for the capacity of communicating a multiplicity of information about the meal transportation containers, such as the temperatures within the food tray accommodation area 31 to the user. The control panel 46 can also provide a global positioning system (GPS) to provide location information and an antenna to connect the meal transportation container with a wireless communication network. An online portal in communication with the meal transportation container can be utilized by a user for interacting with the control panel 46, as described in detail below.

Figure 4:
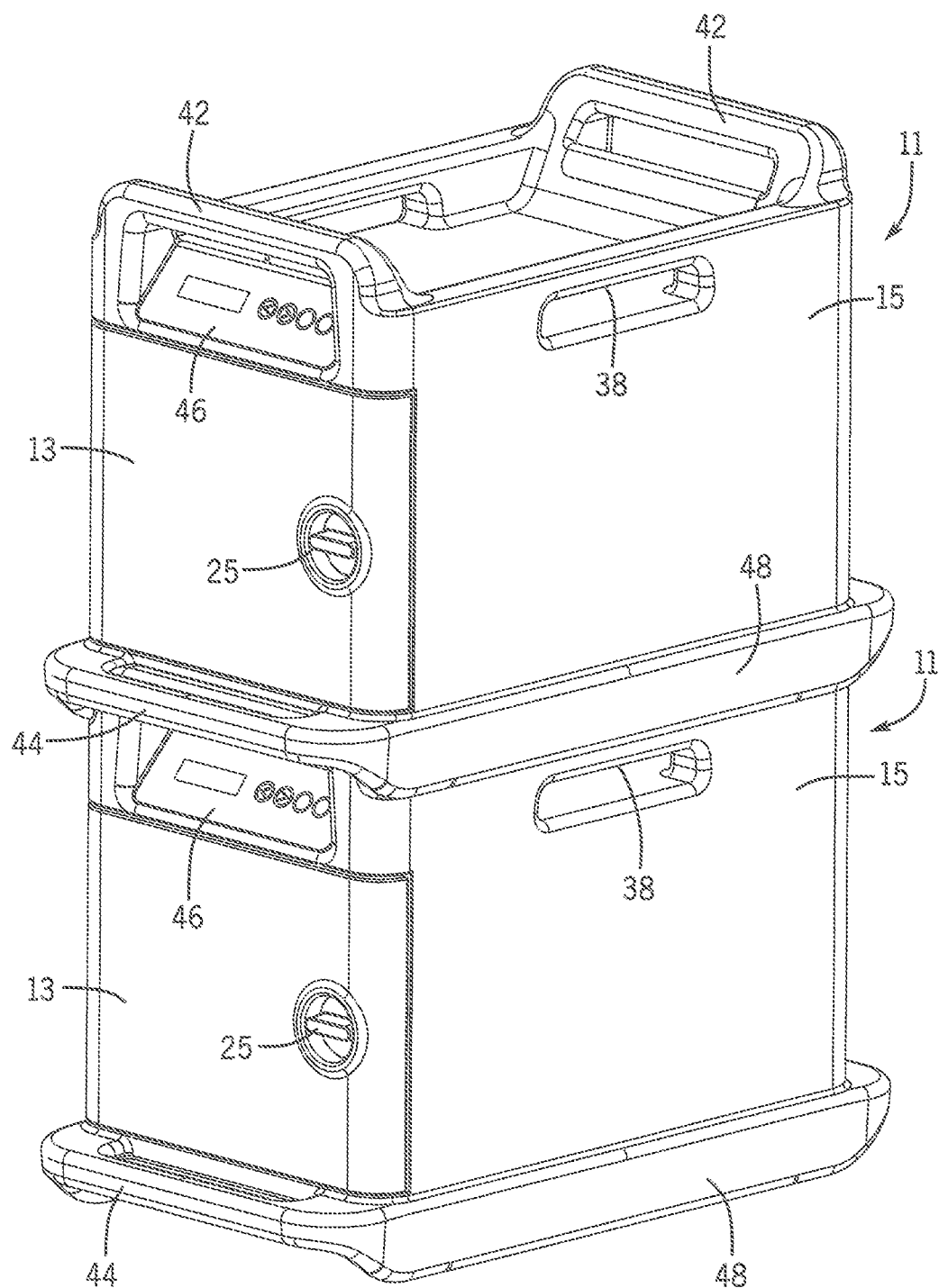
FIG. 4 is a perspective view of a plurality of meal transportation containers of FIG. 1 stacked.

As seen in FIG. 4, the meal transportation containers are designed to be easily and securely stacked with other meal transportation containers. Thus, because the integral upper carrying handles 42 have a width recessed from the outer periphery of the meal transportation container while the integral lower handles 44 have a width greater than outer periphery of the meal transportation container, the integral upper carrying handles 42 and the upper panel 19 are designed to nest with the lower panel 21 and the integral lower handles 44, with the upwardly extending integral upper carrying handles 42 nesting within an aperture defined by the outwardly extending integral lower handles 44. The pair of integral lower handles 44 have sufficient width greater than the outer periphery of the meal transportation container such that they are still accessible when nested above or below another meal transportation unit. The lower panel 21 includes a pair of rails 48 designed to provide stability when resting on a floor.

The integral lower handles 44 are positioned such that a user can easily access the integral lower handles 44 when the meal transportation containers are stacked. The control panel 46 is positioned so that the input interface is accessible and the display is visible when stacked. In an embodiment, the control panel 46 can be located on an angled recessed portion near the upper periphery of the meal transportation container so that the panel is accessible and the screen is visible when stacked.

Figure 5:
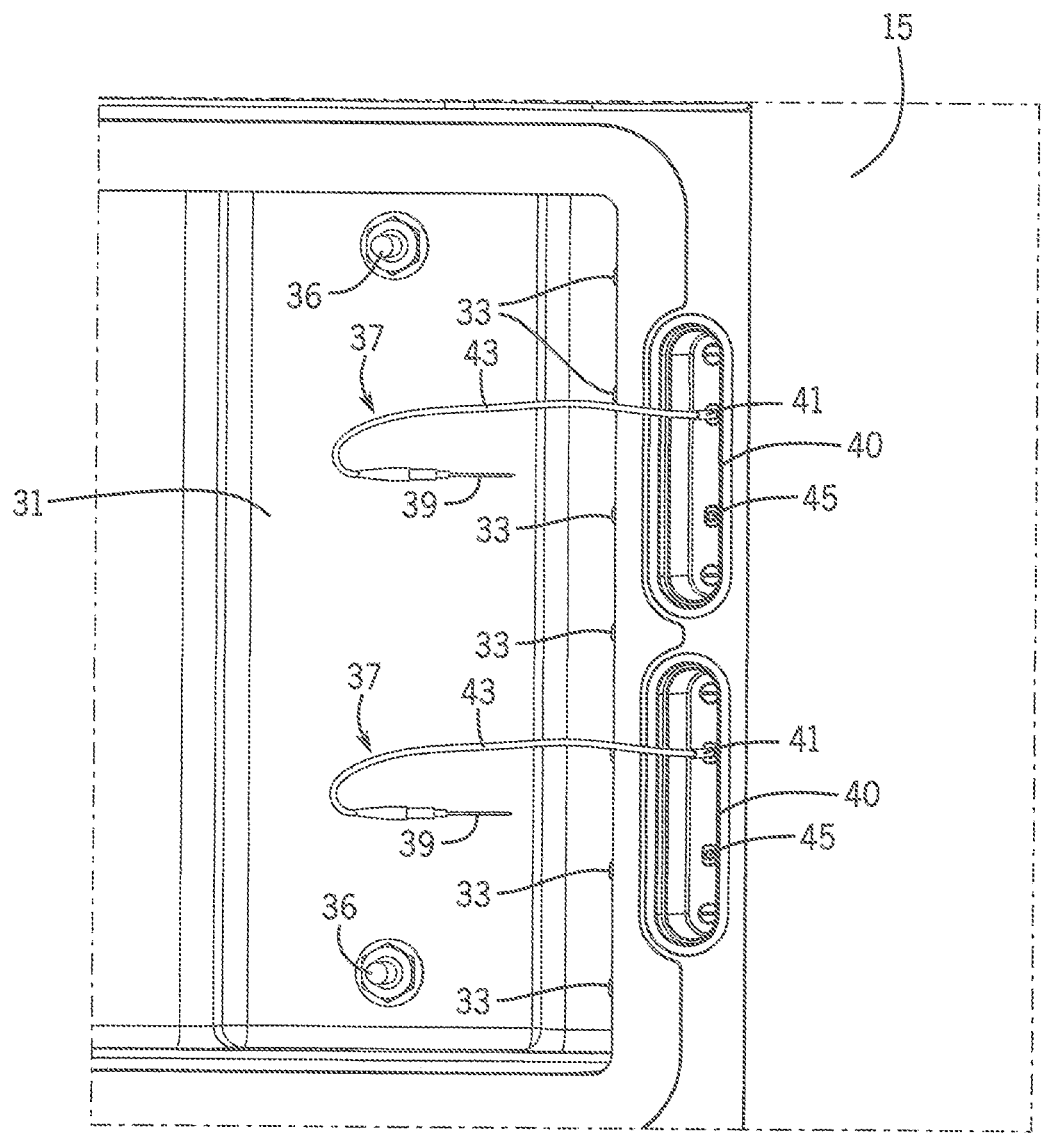
FIG. 5 is a perspective closeup view of temperature monitoring hardware of the meal transportation container of FIG. 1.

Referring to FIG. 5, a perspective closeup view of temperature monitoring hardware of the meal transportation container of FIG. 1 is seen. A plurality of internal thermometers 36 can be provided in the interior of the food tray accommodation area 31 to monitor the temperature of the food tray accommodation area 31. In addition, a plurality of food thermometers 37 can be provided in the interior of the food tray accommodation area 31 to monitor the temperature of food in a food tray 35. The food thermometer food temperature monitoring in conjunction with the remote monitoring and control of the meal transportation container can be utilized to create a feedback loop from to regulate the amount of heat input to retherm the food by product type to ensure food quality. The food thermometer food temperature monitoring in conjunction with the remote monitoring of the meal transportation container can be utilized to track food temperature for food safety within the required temperature zones for cold holding, hot holding, and time to rethermalize In an embodiment, the food thermometers 37 can comprise a sensing element 39 connected to a male connector 41 via a sensor cable 43. A plurality of matched female connectors 45 can be provided in food thermometer ports 40 adjacent the food tray accommodation area 31—in this embodiment in the side panel 15 bordering the door handle 25—into which the plurality of thermometers 37 can be connected. The matched female connectors 45 are in electronic communication with the main printed circuit board (PCB) 73, and the thermometers 36, 37 and PCB 73 are powered by the rechargeable battery, as detailed below.

Figure 6B:
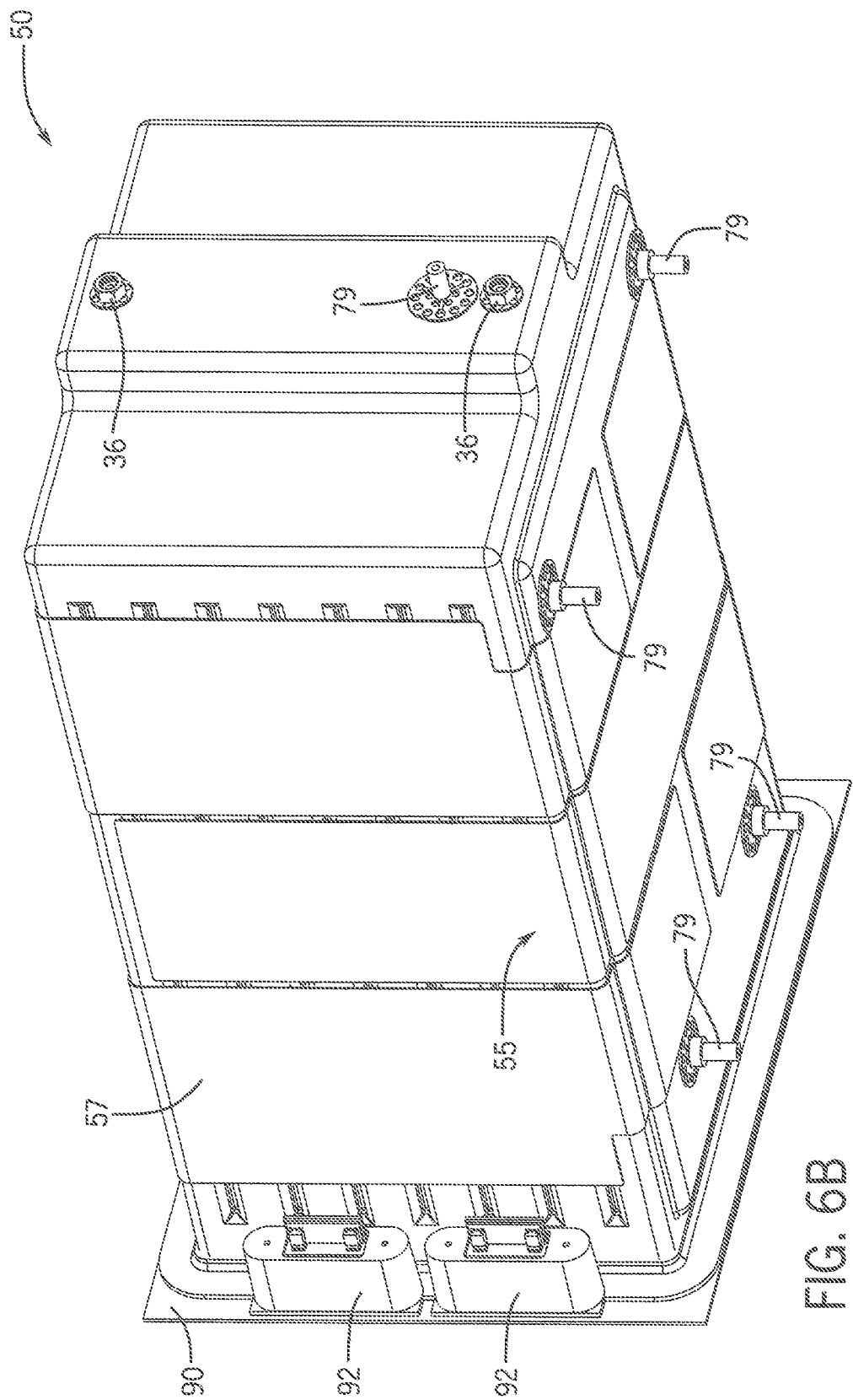
FIG. 6B is bottom rear angled view of food tray accommodation area housing of the meal transportation container of FIG. 1

Referring to FIG. 6, FIG. 6A is top front angled view of food tray accommodation area housing 50 of the meal transportation container of FIG. 1 while FIG. 6B is bottom rear angled view of the food tray accommodation area housing 50 of the meal transportation container of FIG. 1. As seen in FIG. 6B, a plurality of shelf mounting hardware elements 79 are provided to connect the food tray accommodation area housing 50 to the lower panel 21 and rear panel 17 of the outer box 11. In order to thermally isolate the food tray accommodation area housing 50 from the outer box 11, the plurality of shelf mounting hardware elements 79 can include a thermal insulator 85 such as for example a ceramic washer.

As previously introduced, a meal transportation container in accordance with the principals of the present invention is designed to be capable of: heating a given amount of cooled food (for example, approximately 25 lbs. (11.5 kg)) to an appropriate hot-serving temperature (for example, to 165° F. (79.9° C.) in less than two hours); cooking a given amount of raw food (for example, approximately 25 lbs. (11.5 kg) at up to 400° F. (200° C.); and maintaining a hot-serving temperature (for example, above 150° F. (65.5° C.)) for a sufficient time period (for example, at least four hours and preferably six hours). Of course, to maintain a hot-serving temperature less heating capacity is needed than the heating capacity required to "retherm" cooled food; likewise, to cook raw food greater heating capacity is required than the heating capacity required to "retherm" cooled food.

In an aspect in accordance with the principals of the present invention, this three-level heating capacity can be economically achieved by utilizing a pair of resistive heating elements 55, 57, each having differing performance parameters. In order to provide for efficient thermal conduction from the resistive heating elements, the food tray accommodation area housing 50 can be wrapped with a first resistive heating element 55 and a second resistant heating element 57. In addition, to aid in efficient thermal conduction the food tray accommodation area housing 50 can be made of a thermally conductive material, such as, for example, aluminum. As less heating capacity is required to maintain a hot-serving temperature, the first resistive heating element 55 can be provided having a relatively lower capacity relative to the second resistive heating element 57, which has a higher heating capacity sufficient to "retherm" cooled food. The second resistive heating element 57 can provide sufficient temperature to cook raw food at a lower range of cooking temperatures while by utilizing the first resistive heating element 55 and the second resistive heating element 57 together, heating capacity sufficient to cook raw food at a higher range of cooking temperatures can be achieved.

In an implementation, the first resistive heating element 55 can be provided 24 volts of direct current at two amps delivering 150 watts of power to maintain a hot-serving temperature utilizing direct current power from the battery. The second resistive heating element 57 can be provided 120 volts of alternating current at 7.5 amps delivering 900 watts of power to "retherm" cooled food and to cook raw food at a lower range of cooking temperatures utilizing alternating current power from a wall outlet. The greater heating capacity required to cook raw food at a higher range of cooking temperatures can be delivered by utilizing both the first resistive heating element 55 and the second resistant heating element 57 at the same time. Thus, by utilizing both the first resistive heating element 55 and the second resistant heating element 57 at the same time power between 900 watts (if only using the second resistive heater 57) up to 1050 watts (utilizing both the first resistive heating element 55 and the second resistant heating element 57) can be provided by cycling the first resistive heating element 55 on/off to emulate any in between wattage such as, for example, 1000 watts. Of course, alternative heating means can be provided such as, for example, where the food tray is made of a conductor such as stainless steel, inductive heating elements can be utilized.

Figure 7A:
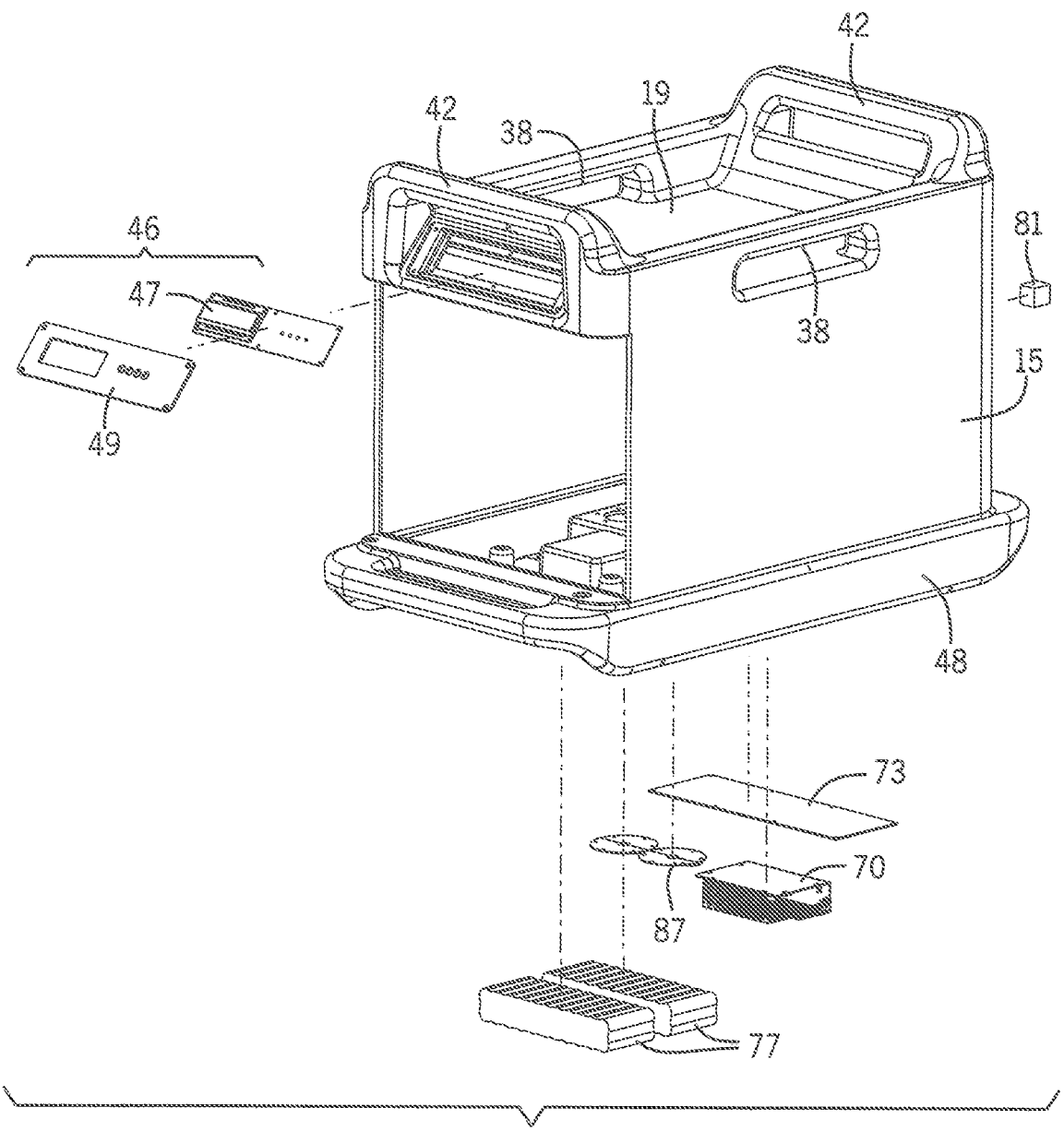
FIG. 7A is a partially exploded view of the box sub-assembly of the meal transportation container of FIG. 1.

In more detail, in an aspect in accordance with the principals of the present invention, the meal transportation container can be viewed as comprising three sub-assemblies; a box sub-assembly; a shelf sub-assembly; and a door sub-assembly. Referring to FIG. 7A, a partially exploded view of the box sub-assembly of the meal transportation container of FIG. 1 is seen. In an implementation in accordance with the principals of the present invention, the upper panel 19, the lower panel 21, the side panels 15, the rear panel 17, the integral side handles 38, the integral upper carrying handles 42, the integral lower handle 44, and the rails 48 of the meal transportation container can be comprised of a unibody design rotationally molded with a linear low-density polyethylene (LLDPE).

The control panel 46 includes the control panel printed circuit board (PCB) including the display 47 and the user input buttons 49. With the control panel 46, the power supply 70, rechargeable batteries 77, main printed circuit board (PCB) 73, and wire passthrough 87 comprise the meal transportation container control electronics. The power supply 70 can be connected to a wall outlet via an electrical plug 81 provided in the rear panel 17 (seen in FIG. 7A). The electrical plug 81 can be connected to a wall outlet with a charging cable. An on/off switch can be provided as well. The power supply 70 provides power to charge/recharge the batteries 77 and provides the energy to accomplish high energy delivery to power the resistive heating element 57 to "retherm" cooled food. Thus, for example, the power supply 70 powers, and turns the resistive heating element 57 on/off based on a signal from the PCB 73. The rechargeable battery 77 is sufficient to power the first resistive heating element 55 to maintain the heated food as well as providing power to the electronics such as the control panel 46, PCB 73, thermometers 35, 37, etc.

The main printed circuit board (PCB) 73 is in electronic communication with the control panel printed circuit board (PCB) 46. The PCB 73 contains operational software code for the various functional components of the meal transportation container. Thus, for example, the PCB 73 is in electronic communication with the female connectors 45 provided on the interior sidewalls of the food tray accommodation area 31 into which the male connectors 41 connected to sensor cables 43 and the sensing elements 39 of the plurality of food thermometers 37 can be connected. The PCB 73 can also provide control logic/components (relays) for powering the resistive heating elements, for controlling the flow of alternating current power from the wall outlet and direct current power from the battery, cellular communication, Wi-Fi communication, and additional optional sensors such as a door open sensor, humidity sensors, battery charge level sensor, etc.

As previously introduced, the food tray accommodation area housing 50 is contained within enhanced insulation to reduce temperature losses. In an implementation in accordance with the principals of the present invention, the enhanced insulation can comprise two-layers: a first layer 63 can comprise an aerogel inner insulation blanket and a second layer 65 can comprise a plurality of vacuum insulation panels. In an embodiment, the first layer 63 can comprise a five mm thick flexible aerogel inner insulation blanket having low density and extremely low thermal conductivity. The second layer 65 can comprise a plurality of 10 mm thick rigid vacuum insulation panels that provide for enhanced insulation at low weight and thickness corresponding to each of the side panels 15, rear panel 17, upper panel 19, and lower panel 21. In an additional embodiment comprising a plurality of food tray accommodation areas within a meal transportation container. Further insulation can be provided between food tray accommodation areas such that each food tray accommodation area is insulated from the other food tray accommodation area. Of course, foam or other insulation means could also be utilized.

Referring to FIG. 7B, a partially exploded view of the shelf sub-assembly of the meal transportation container of FIG. 1 is seen. The food tray accommodation area housing 50 can be wrapped by the first resistive heating element 55 and the second resistant heating element 57, which in turn can be surrounded by the first insulation layer blanket 63. The plurality of insulation panels of the second insulation layer 65 are seen corresponding to the side panels, rear panel, upper panel, and lower panel.

In an implementation in accordance with the principals of the present invention, the food tray accommodation area housing 50 can be comprised of an aluminum 5052 alloy sheet metal stamped to provide the plurality of ledges 33 and bended to be welded together. For food safety and cleanability, internal corner radii can be greater than ¼" (6 mm), an indentation 66 be defined at the bottom to catch spills and condensation, and the interior can be coated with a polytetrafluoroethylene (PTFE). With the shelf mounting hardware elements 79, to maintain the thermal isolation and to insure a user does not directly contact the heated areas of the food tray accommodation area housing 50 a thermal gasket 86 can be provided between a front lip 88 of the food tray accommodation area housing 50 and an outwardly exposed face plate 90. The face plate 90 can also include food thermometer port housing 92.

Figure 8A:
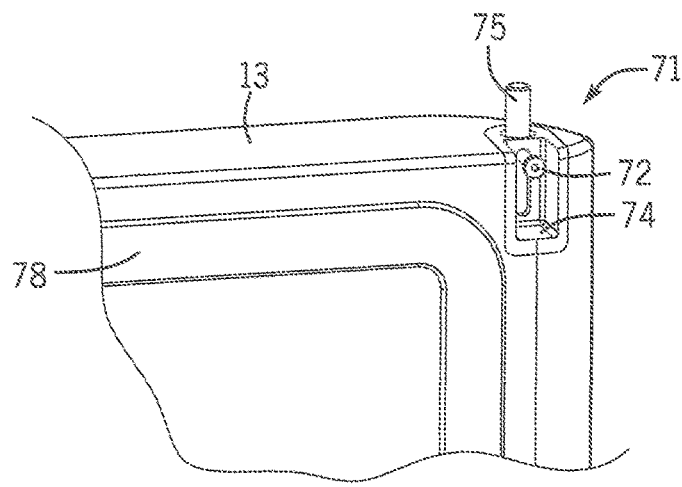
FIG. 8A is a detailed view of the door sub-assembly of the meal transportation container of FIG. 1 is the secured position.
Figure 8B:
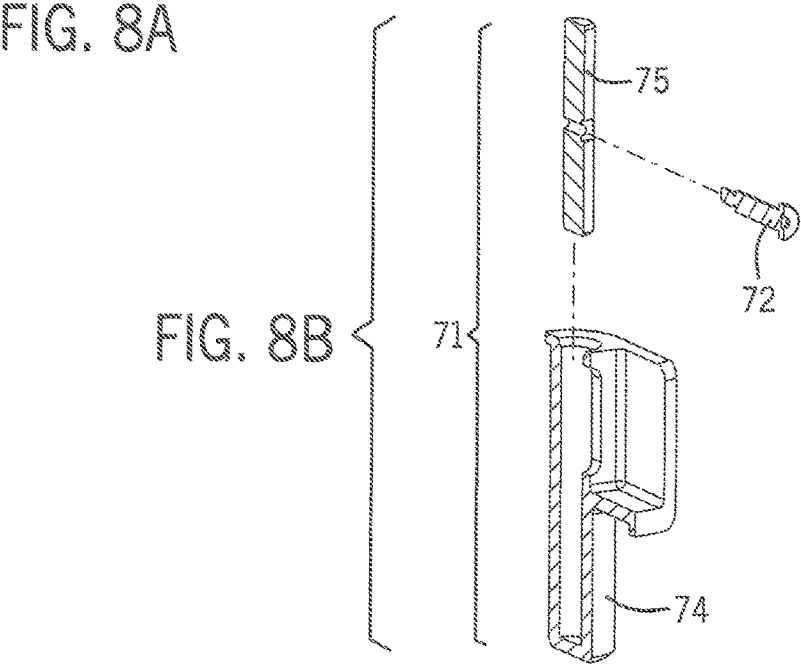
FIG. 8B is an isolated cross-sectional view of the top spring-loaded hinge mechanism of FIG. 8A in the removed position.
Figure 8C:
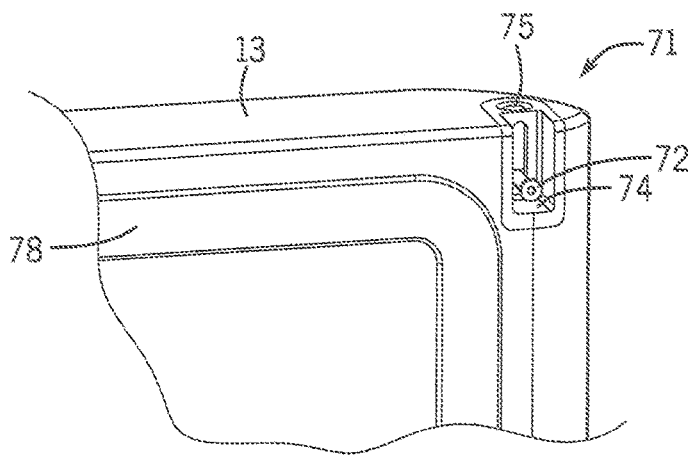
FIG. 8C is an isolated cross-sectional view of the top spring-loaded hinge mechanism of FIG. 8A.

As previously introduced, the door sub-assembly makes up the front panel 13 and is utilized to gain access to the interior of the meal transportation container. In an implementation in accordance with the principals of the present invention, the door sub-assembly can comprise a removable door 13 which allows for the door sub-assembly to be removed from the shelf sub-assembly to aid in cleaning both sub-assemblies for food safety. The removable door 13 can be hingedly connected to the shelf sub-assembly by a top spring-loaded hinge mechanism 71 contained in closed housing 74. Referring to FIG. 8, detailed views of the top spring-loaded hinge mechanism 71 in the removable door 13 of the meal transportation container of FIG. 1 are seen. The top spring-loaded hinge mechanism 71 comprises a sliding handle 72 secured to an extended pin 75. The extended pin 75 can be secured in cooperating aperture defined in the adjacent housing of the integral upper carrying handle 42; likewise, a pin on the bottom of the removable door 13 can be secured in cooperating aperture defined in the adjacent housing of the integral lower handle 44. As seen in FIG. 8B, to disengage the removable door 13, the top spring-loaded hinge mechanism pin 75 can be retracted by sliding the sliding handle 72, and the removable door 13 can be pivoted out. Referring to FIG. 8C, an isolated, cross-sectional view of the top spring-loaded hinge mechanism 71 is seen. The closed housing design 74 ensures splashes can be easily cleaned and potential contaminants contained outside the interior of the removable door 13. The top spring-loaded hinge mechanism 71 can be partly disassembled and washed down as part of the door removal and cleaning process for food safety.

Likewise, the door handle 25 can connect to upper and lower retractable door locking pins 80 (best seen in FIG. 2) that can be secured in cooperating apertures defined in the adjacent housing of the integral upper carrying handle 42 and lower integral handle 44. Like the shelf sub-assembly, the door sub-assembly can incorporate a first aerogel inner insulation layer and a second vacuum insulation panel layer contained between an outer LLDPE panel and an inner PTFE coated aluminum 5052 alloy sheet metal panel. The door 13 can include a gasket 78 to improve the seal between the closed door 13 and the outwardly exposed face plate 90 of the food tray accommodation area housing 50.

Figure 9A:
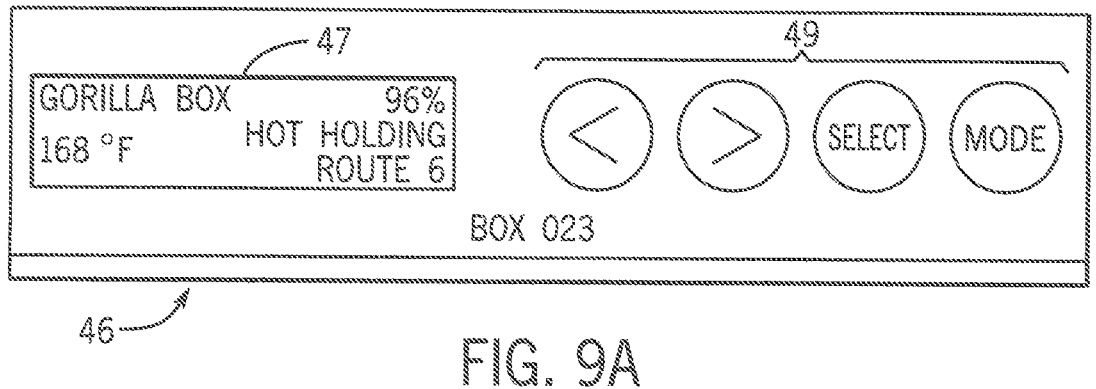
FIG. 9A is an example of detail of a control panel of the meal transportation container of FIG. 1.

As previously introduced, the control panel 46 provides for communicating a multiplicity of information about the meal transportation containers. Referring to FIG. 9A, detail of an example of a control panel 46 is seen, which can comprise a control panel printed circuit board (PCB) including a control panel display 47 and control panel input buttons 49. The control panel input buttons 49 can include a "mode" button that can be used to select the manner in which the meal transportation container will be utilized. In an implementation in accordance with the principals of the present invention, the mode can be selected from among an "IDLE" mode, a "RETHERM" mode, a "HOT HOLDING" mode, and an "OVEN" mode. In the "IDLE" mode, either cooled food or heated food can be maintained by the enhanced insulation capacity of the meal transportation container and—in the case of cooled food—aided by the frozen eutectic plate inside the food tray accommodation area. In the "RETHERM" mode, cooled cooked food can be reheated utilizing a heating element of the meal transportation container powered by an outlet power supply. In the "HOT HOLDING" mode, heated food can be maintained utilizing a different heating element of the meal transportation container powered by alternating current from an outlet power supply. In the "OVEN" mode, raw food can be cooked by the second resistive heating element at a lower range of cooking temperatures and at a higher range of cooking temperatures by combining the pair of heating elements of the meal transportation container. A "select" button can be used to select displayed settings, and a scroll right arrow and a scroll left arrow can be used to scroll through a menu. In the FIG. 9A example, the control panel is for meal transportation container box 023, which is currently assigned to "ROUTE 6" in the "HOT HOLDING" mode at "168° F.".

Figure 9B:
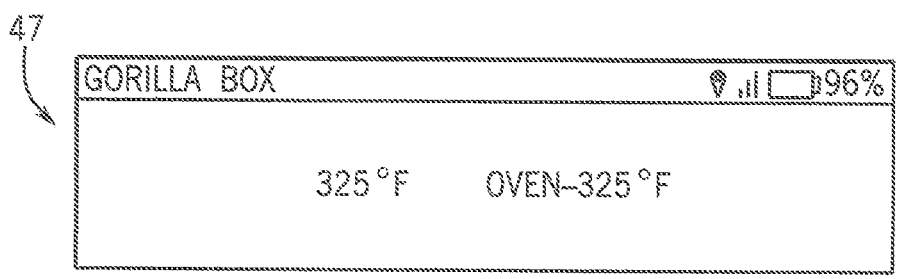
FIG. 9B is an example of detail of a "home" screenshot of the control panel display panel of the control panel of FIG. 9A.
Figure 9C:
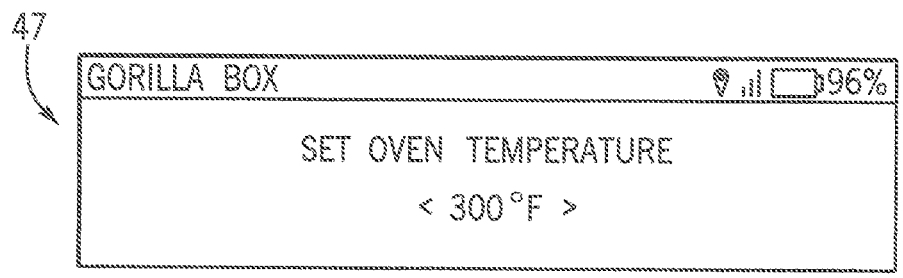
FIG. 9C is an example of detail of a "set oven temperature" screenshot of the control panel display panel of the control panel of FIG. 9A.
Figures 9D, 9E, 10:
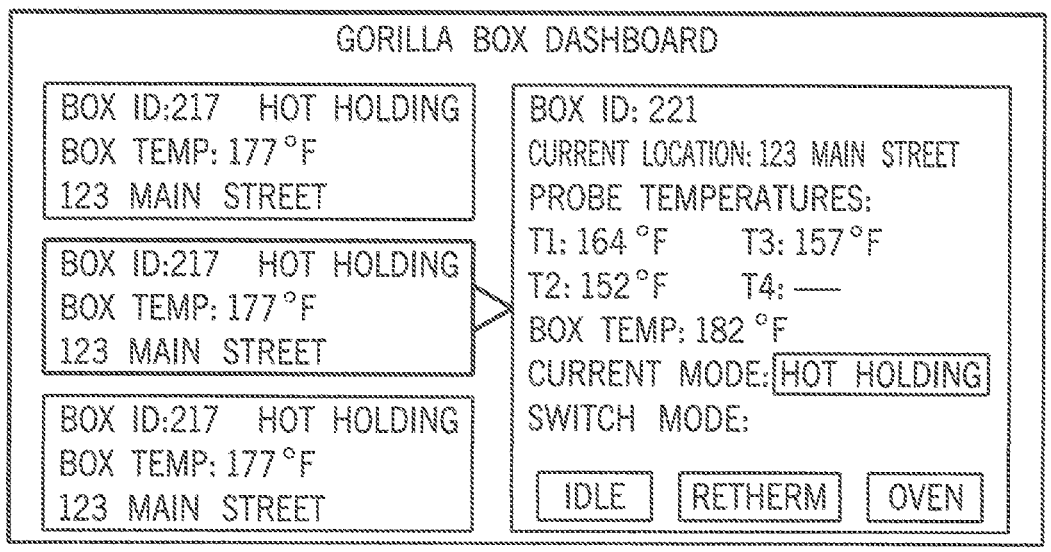
FIG. 9D is an example of detail of a "food temperature" screenshot of the control panel display panel of the control panel of FIG. 9A.
FIG. 9E is an example of detail of a "oven temperature" screenshot of the control panel display panel of the control panel of FIG. 9A.
FIG. 10 is an example of detail of a "dashboard" screenshot of an online portal to be used with the meal transportation container of FIG. 1.

In addition to food probe temperature and internal box temperature, the control panel display information can include the current box state, the battery level, GPS & cellular connectivity via the antenna, and general settings. Referring to FIG. 9B, an example of a "home" screenshot of the control panel display 47 is seen. In this example, the current box state is "OVEN" mode set to "325° F.", the battery is 96% charged, GPS and cellular connections are strong, and the internal box temperature is "326° F.". In FIG. 9C an example of a "set oven temperature" screenshot of the control panel display 47 is seen. In this example, the oven temperature is set at "325° F.", and the arrow keys can be utilized to change this setting. In FIG. 9D an example of a "food temperature" screenshot of the control panel display 47 is seen. In this example, food probe number 1 indicates a food temperature of "154° F." while food probe number 3 indicates a food temperature of "162° F." (food probe numbers 2 and 4 are not in use). In FIG. 9E an example of a "oven temperature" screenshot of the control panel display 47 is seen where the temperatures measured by the two internal thermometers 36 is being displayed. In this example, the top internal thermometers 36 has an oven temperature of "186° F." while the bottom internal thermometers 36 has an oven temperature of "172° F.".

As previously introduced, the control panel 46 further provides for communicating of information communicated via the antenna over a wireless communication network and the internet to an online portal. Such online portal can provide for remote control and monitoring of meal transportation containers in a client's account. Referring to FIG. 10, an example of a "dashboard" screenshot of an online portal is seen. In FIG. 10 the left column displays general information identifying multiple meal transportation containers in a client's account, such as box ID, box mode, box temperature, and the location of the box. In the FIG. 10 example, the current location for box 217 is seen to be "123 Main Street" as determined by GPS in the meal transportation container, the current mode is "hot holding", and the current box temperature is 177° F. while for box 221 the location is seen to be "123 Main Street", the current mode is "retherm", and the current box temperature is 182° F. By selecting an entry from the left column, further detail with respect to that box can be displayed in the right column. In the FIG. 10 example, the current location for box 218 is seen to be "456 First St" and the current mode of "hot holding" can be changed by selecting the desired mode button in the "switch mode" area. For box 218, the box temperature is "168° F.", and the probe 1 food temperature is "164° F.", the probe 2 food temperature is "152° F.", and the probe 3 food temperature is "157° F." (probe 4 is not in use).

Figure 11:
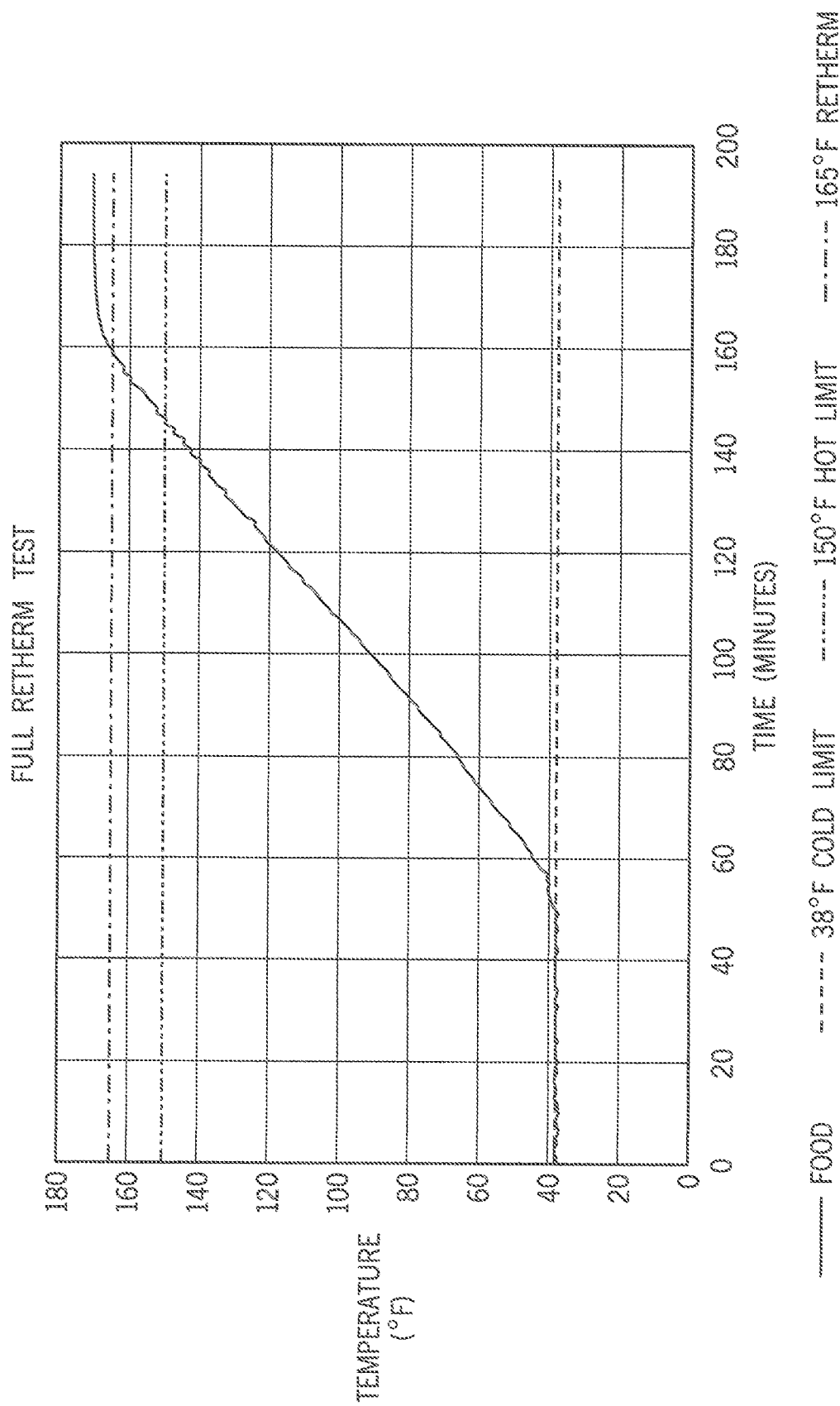
FIG. 11 is an example retherm profile graph in accordance with the principals of the present invention.

Referring to FIG. 11, an example retherm profile graph in accordance with the principals of the present invention is seen. Temperature is represented on the vertical axis and time is represented on the horizonal axis. The solid (----) line represents the temperature of the food, the dash (- - - -) line represents the 38° F. (3.3° C.) cold limit, the dash double dot (-••-••-••-) line represents the 150° F. (65.5° C.) hot limit, and the dash single dot (-•-•-•-) line represents the 165° F. (79.9° C.) retherm. An initial cold storage phase for 50 minutes can be achieved utilizing the example frozen eutectic plate inside the food tray accommodation area. A retherm stage heats the cooked food from 38° F. (3.3° C.) to 165° F. (79.9° C.) in an hour and 40 minutes using the resistive heating element utilizing alternating current power from a wall outlet, during which time the battery is also being recharged. Hot storage of at least 165° F. (79.9° C.) can be achieved using the resistive heating elements utilizing just 30 W of either direct current power from the recharged battery or alternating current power from a wall outlet. Thus, adequate performance for cold storage, reheating, and hot storage can be achieved.

While the invention has been described with specific embodiments, other alternatives, modifications, and variations will be apparent to those skilled in the art. Accordingly, it will be intended to include all such alternatives, modifications and variations set forth within the spirit and scope of the appended claims.

What is claimed is:

1. A temperature-controlled meal transport container comprising:
   a front panel, the front panel providing access to an interior of the meal transport container;
   a pair of side panels, a rear panel, an upper panel, and a lower panel that, together with the front panel define an outer box;
   a food tray accommodation area defined in the interior of the meal transport container, the food tray accommodation area having interior sidewalls defining a plurality of ledges designed to act together in pairs to receive and support an outer flange of a food tray, the plurality of ledges positioned to accommodate a plurality of different sized food trays in the food tray accommodation area;
   an insulator provided between the outer box and the food tray accommodation area to insulate the interior of the meal transport container;
   a pair of integral upper carrying handles provided at a front periphery and a rear periphery extending above the upper panel, the integral upper carrying handles having a width recessed from the outer periphery of the meal transportation container, the meal transportation container being sized such that by utilizing the integral upper carrying handles a single user can carry the meal transportation container;
   a pair of integral lower handles provided at a front periphery and rear periphery extending in front of the front panel and rear panel, the integral lower handles having a width greater than outer periphery of the meal transportation container, the integral upper carrying handles designed to nest with the integral lower handles when a plurality of meal transport containers are stacked, the integral lower handles having sufficient width greater than the meal transportation container outer periphery such that the integral lower handles are still accessible when nested above or below another meal transportation unit; and a control panel contained on an exterior of the meal transport container, the control panel adapted to be accessible when a plurality of meal transport containers are stacked.

2. The temperature-controlled meal transport container of claim 1 further comprising a plurality of thermometers contained within the food tray accommodation area.

3. The temperature-controlled meal transport container of claim 2 further comprising a plurality of thermometers in the food tray accommodation area to monitor the temperature of the food tray accommodation area and regulate an amount of heat input to retherm the food by product type, the thermometers in electronic communication with the control panel.

4. The temperature-controlled meal transport container of claim 2 further comprising a plurality of food thermometers adapted to be used in association with the food trays contained in the food tray accommodation area to monitor the temperature of food and regulate an amount of heat input to retherm the food by product type, the food thermometers in electronic communication with the control panel.

5. The temperature-controlled meal transport container of claim 1 further comprising a cooling element in the food tray accommodation area.

6. The temperature-controlled meal transport container of claim 5 further wherein the cooling element comprises a frozen eutectic plate with outer flanges to supported by a pair of ledges.

7. The temperature-controlled meal transport container of claim 1 further comprising a pair of heating elements corresponding to the food tray accommodation area.

8. The temperature-controlled meal transport container of claim 7 further comprising a first heating element capable of maintaining heated food at heated temperature from direct current power from a rechargeable battery.

9. The temperature-controlled meal transport container of claim 7 further comprising a second heating element capable of retherming unheated food to heated temperature from power from a power outlet.

10. The temperature-controlled meal transport container of claim 7 further comprising the combined pair of heating elements capable of cooking food.

11. The temperature-controlled meal transport container of claim 7 further wherein the heating elements comprise resistive heating elements.

12. The temperature-controlled meal transport container of claim 11 further wherein the resistive elements are wrapped around the food tray accommodation area.

13. The temperature-controlled meal transport container of claim 1 further wherein the control panel is located on an angled recessed portion near an upper periphery of the meal transportation container such that an input interface is accessible and a display is visible when a plurality of meal transportation containers are stacked.

14. The temperature-controlled meal transport container of claim 1 further wherein the front panel comprises a removable door mechanism.

15. The temperature-controlled meal transport container of claim 14 further wherein the removable door mechanism is hingedly connected by a top spring-loaded hinge mechanism contained in closed housing.

16. The temperature-controlled meal transport container of claim 1 further wherein the insulator comprises a first aerogel inner insulation blanket layer and a second vacuum insulation panel layer.

17. The temperature-controlled meal transport container of claim 1 further wherein a pair of integral side handles are defined in the side panels.

* * * * *